United States Patent
Smith

(10) Patent No.: US 6,219,785 B1
(45) Date of Patent: *Apr. 17, 2001

(54) RECONFIGURABLE COMPUTER ARCHITECTURE USING PROGRAMMABLE LOGIC DEVICES

(75) Inventor: Stephen J. Smith, Los Gatos, CA (US)

(73) Assignee: Altera Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/559,202

(22) Filed: Apr. 26, 2000

Related U.S. Application Data

(63) Continuation of application No. 08/911,958, filed on Aug. 15, 1997, now Pat. No. 6,085,317
(60) Provisional application No. 60/043,382, filed on Apr. 4, 1997.

(51) Int. Cl.[7] .................................................. G06F 15/177
(52) U.S. Cl. .................................................. 713/1; 713/100
(58) Field of Search .................................. 713/1, 2, 100

(56) References Cited

U.S. PATENT DOCUMENTS

| | | | |
|---|---|---|---|
| 4,268,908 * | 5/1981 | Logue et al. | 712/38 |
| 4,399,516 * | 8/1983 | Blahut et al. | 708/230 |
| 4,583,193 * | 4/1986 | Kraft et al. | 364/900 |
| 5,379,382 * | 1/1995 | Work et al. | 710/63 |
| 5,465,056 * | 11/1995 | Hsieh et al. | 326/41 |
| 5,469,003 * | 11/1995 | Kean | 326/39 |
| 5,550,782 * | 8/1996 | Cliff et al. | 365/230.03 |
| 5,784,636 * | 7/1998 | Rupp | 712/37 |
| 6,085,317 * | 7/2000 | Smith | 713/1 |

* cited by examiner

*Primary Examiner*—Dennis M. Butler
(74) *Attorney, Agent, or Firm*—Beyer, Weaver & Thomas LLP

(57) ABSTRACT

A method and system for computing using a reconfigurable computer architecture utilizing programmable logic devices is disclosed. The computing may be accomplished by configuring a first programmable logic unit as a system controller. The system controller directs the implementation of an algorithm in a second one of the programmable logic units concurrently with reconfiguring a third one of the programmable logic units. In another aspect, the computing system may include a pair of independent, bi-directional busses each of which is arranged to electrically interconnect the system controller and the plurality of programmable logic devices. With this arrangement, a first bus may be used to reconfigure a selected one of the programmable logic devices as directed by the system controller while the second bus is used by an operational one of the programmable logic devices.

14 Claims, 12 Drawing Sheets

RECONFIGURABLE COMPUTER ARCHITECTURE USING PROGRAMMABLE LOGIC DEVICES

CROSS REFERENCE TO RELATED APPLICATIONS

This application is a continuation of application Ser. No. 08/911,958 entitled, "Reconfigurable Computer Architecture Using Programmable Logic Devices" by Smith, filed Aug. 15, 1997, now U.S. Pat. No. 6,085,317, which is incorporated by reference in its entirety, which claims benefit of provisional appln 60/043,382 Apr. 4, 1997.

BACKGROUND OF THE INVENTION

1. Field of the Invention

This invention relates generally to reconfigurable computer architectures for reconfigurable computing using Programmable Logic Devices.

2. Description of the Related Art

A programmable logic device or PLD is a programmable integrated circuit that allows the user of the circuit, using software control, to customize the logic functions the circuit will perform. The logic functions previously performed by small, medium, and large scale integration integrated circuits can instead be performed by programmable logic devices. When a typical programmable logic device is supplied by an integrated circuit manufacturer, it is not yet capable of performing any specific function. The user, in conjunction with software supplied by the manufacturer or created by the user or an affiliated source, can program the PLD to perform the specific function or functions required by the user's application. The PLD then can function in a larger system designed by the user just as though dedicated logic chips were employed. For the purpose of this description, it is to be understood that a programmable logic device refers to once programmable as well as reprogrammable devices.

Current state of the art computers are fixed hardware systems based upon microprocessors. As powerful as the microprocessor is, it must handle far more functions than just the application it is executing. With each new generation of microprocessors, the application's performance increases only incrementally. In many cases the application must be rewritten to achieve this incremental performance enhancement.

Currently, the trend in microprocessor design is to increase the parallelism of execution in order to boost performance. Current generation microprocessors have multiple special function units all operating in parallel on a single chip. These microprocessors are able to exploit the inherent parallelism in existing programs by executing several instructions during each clock cycle. The limitation in the number of concurrent instructions a microprocessor is capable of executing is not hardware related, as microprocessor designers may place many levels of parallelism upon a given die. Instead, the limitation may be the number of instructions in the software program that can be executed in parallel. Even today's software algorithms run into performance bottlenecks due to branch instructions or data dependencies, which result in a flushing of the multiple execution units.

As an example, to further improve the performance of applications designers have resorted to building hardware accelerators for specific applications. Graphics accelerations is an example of this approach. Typically, a graphic command includes a series of lower level commands, which require many cycles to implement. The resulting performance bottleneck can be avoided by use of additional special purpose hardware. For example, display accelerators generally intercept display requests from the operating system that would normally be executed by the CPU and instead executes them directly in hardware. This is much faster than having the CPU itself execute the corresponding instructions for the display command.

Further enhancements to computing performance could be attained with a system offering dynamic reconfiguration such that several applications could be accelerated with the same hardware system. This is the foundation of reconfigurable computer architectures.

Reconfigurable computing systems are those computing platforms whose architecture can be modified by the software to suit the application at hand. To obtain maximum through-put, an algorithm must be placed in hardware (ie., an ASIC, DSP, etc.). Dramatic performance gains are obtained through the "hardwiring" of the algorithm. In a reconfigurable computing system, this "hardwiring" takes place on a function by function basis as the application executes.

FIG. 1A is an illustration of a prior art routing structure for a reconfigurable computing system architecture known to those skilled in the art as a hypercube. The routing structure illustrated is exemplified by a universal circuit board developed by the Altera Corporation of San Jose, Calif. known as "RIPP10"™. In the illustrated embodiment, there are eight (8) user configurable PLDs 101–108 located at each vertex of hypercube 100, four (4) local memory devices 110–114 located on four edges of hypercube 100, and a global bus 115 originating at the center of hypercube 100. Global bus 115 electrically interconnects all eight user configurable PLDs thereby linking them to an external host computer (not shown). In the example shown, each one of the eight user configurable PLDs are electrically connected to each of its 3 nearest neighbors user configurable PLDs as well as to a fourth user configurable PLD located at the opposite vertex of hypercube 100. For example PLD 101 is connected to its nearest neighbors PLD 102, PLD 104, and PLD 108 as well as PLD 106.

FIG. 1B is a board level schematic representation of the physical interconnects of the "RIPP10"υ universal circuit board. As shown, the array of programmable logic devices and associated local memory communicates with an external host computer via a single global bus 115. Unfortunately, the use of single global bus 115 in this manner substantially precludes the user from simultaneously executing an algorithm in a portion of the array of programmable logic devices while concurrently and independently reconfiguring a different portion of the array. Rather, the user may only reconfigure the entire array in order to implement a single application at a time.

FIG. 1C is a board level schematic representation of local memory hierarchy of the "RIPP10"™ universal circuit board as represented in FIG. 1B. A local group 160 is formed by nearest neighbors PLD 107 and PLD 108 and a shared memory device 114 electrically interconnected by a local bus 162. By way of example, in the RIPP10υ universal circuit board, local memory device 114 takes the form of a commercially available 256K×8 SRAM device and local bus 162 takes the form of a bus structured as a separate address bus and bi-directional data bus totaling 47 active bits.

All local memory is shared with at least one other local PLD and possibly other non-local PLDs which are requesting use of local memory. In theory, any PLD may access any non-local memory device on the board, however, any non-local memory access request will disadvantageously demand additional system processing requirements such as querying permission to use non-local memory, conflict arbitration, and restrictions due to address bandwidth limitations resulting in additional cycle time. Unfortunately, additional system overhead related to conflict arbitration would also have to be implemented.

In view of the foregoing, there is a need for an improved reconfigurable computing system architecture utilizing user configurable PLDs offering dynamic independent partial reconfiguration, advantageous logic to memory ratio, and ease of design.

SUMMARY OF THE INVENTION

A reconfigurable computing system using programmable logic devices and methods for using reconfigurable computing systems are disclosed. In one aspect, the reconfigurable computing system includes a system controller that takes the form of a configured programmable logic unit and a plurality of working programmable logic devices. The computing system also includes a pair of independent, bi-directional busses each of which is arranged to electrically interconnect the system controller and the plurality of programmable logic devices. With this arrangement, a first bus may be used to reconfigure a selected one of the programmable logic devices as directed by the system controller while the second bus is used by an operational one of the programmable logic devices.

In one preferred embodiment, each of the busses has an associated memory unit. The computing system may also include suitable input/output ports and a system clock that provides a plurality of distinct timing signals to the system controller and the programmable logic devices.

In a method aspect of the invention, one of the working programmable logic devices may be dynamically reconfigured while another is actively working. This allows the entire system to be dynamically changed in response to the system condition or to by dynamically upgraded. In one arrangement, a configuration data set suitable for reconfiguring the programmable logic units may be stored in a memory unit connected to one of the bi-directional bus.

DETAILED DESCRIPTION OF THE INVENTION

The invention relates generally to reconfigurable computing system architecture utilizing user configurable programmable logic devices (hereinafter referred to as PLDs) as the operative processing element. Generally, a multiplicity of user configurable PLDs are interconnected by two bi-directional memory busses. A first PLD is configured as a system controller and a plurality of user configurable PLDs act as working PLDs. The use of a plurality of data busses allows the reconfiguration of one of the working PLDs, will another PLD is operating.

Figure 1A:
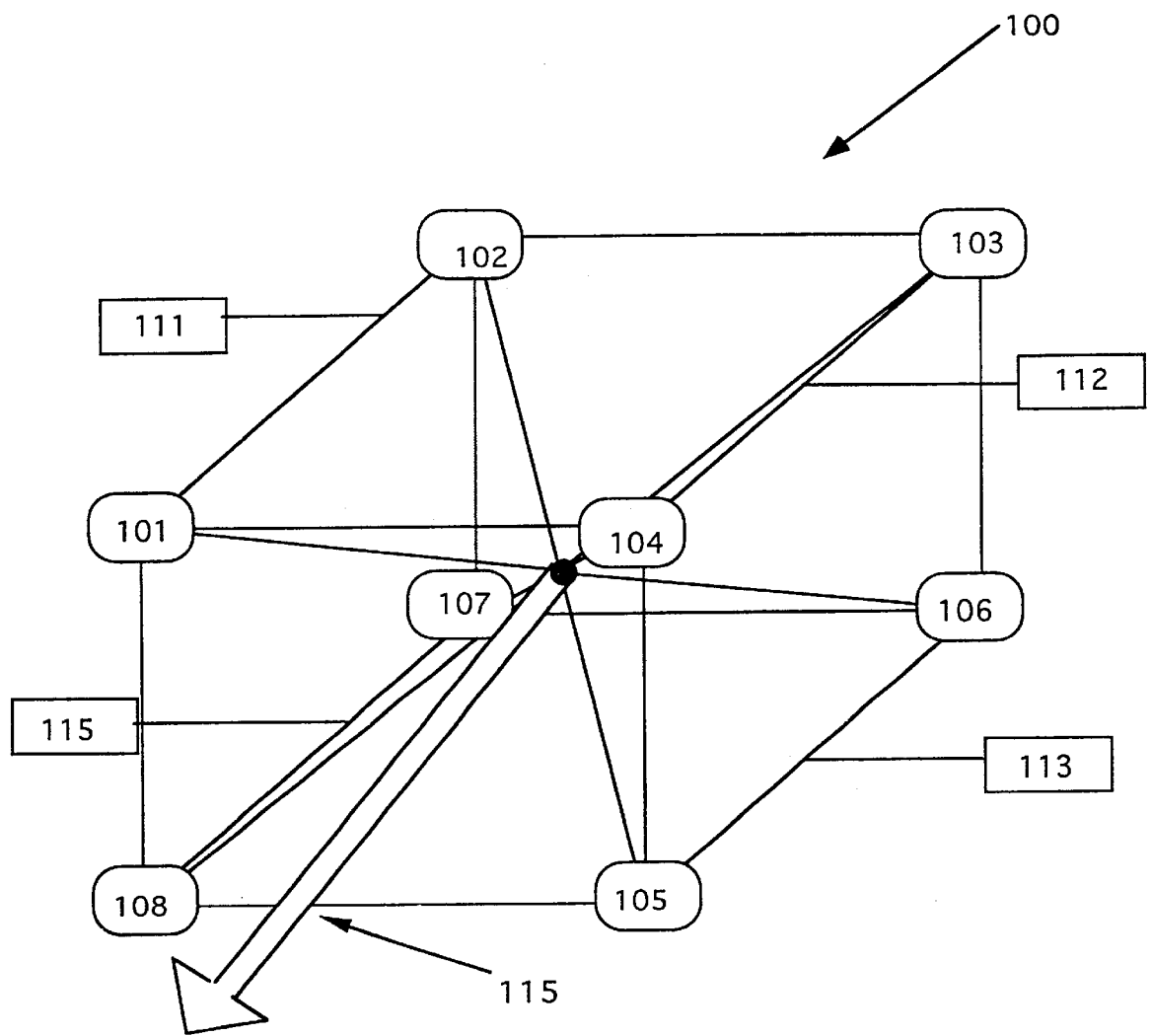
FIG. 1A of a prior art routing structure for a reconfigurable computing system architecture known to those skilled in the art as a hypercube.
Figure 1B:
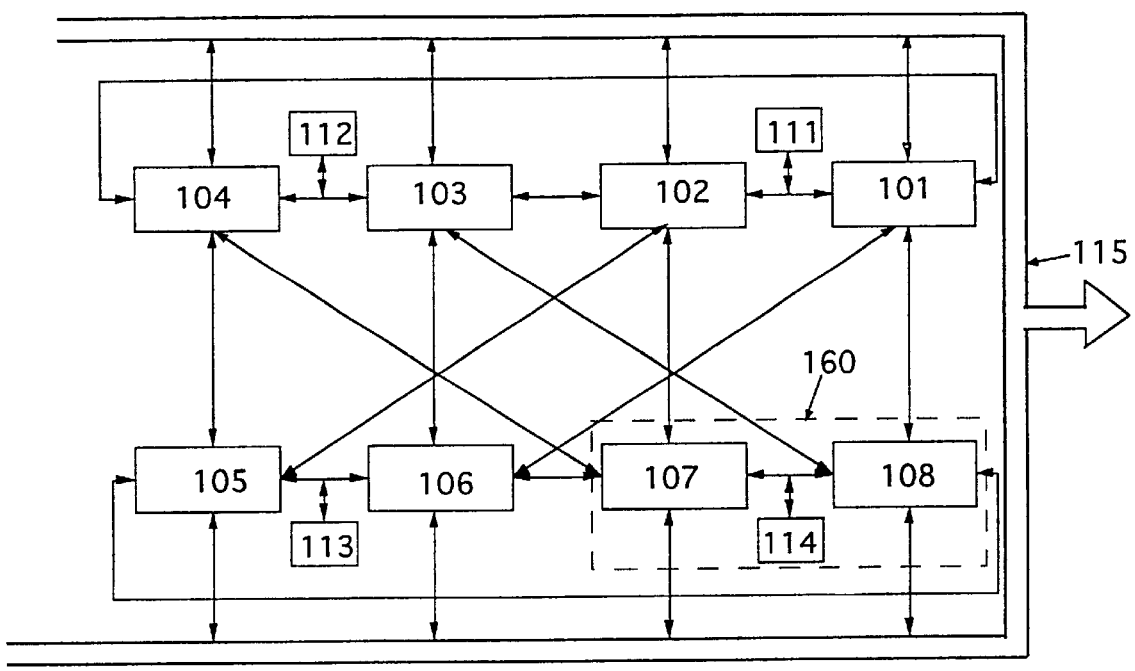
FIG. 1B is a board level schematic representation of the physical interconnects of a prior art reconfigurable computing system.
Figure 1C:
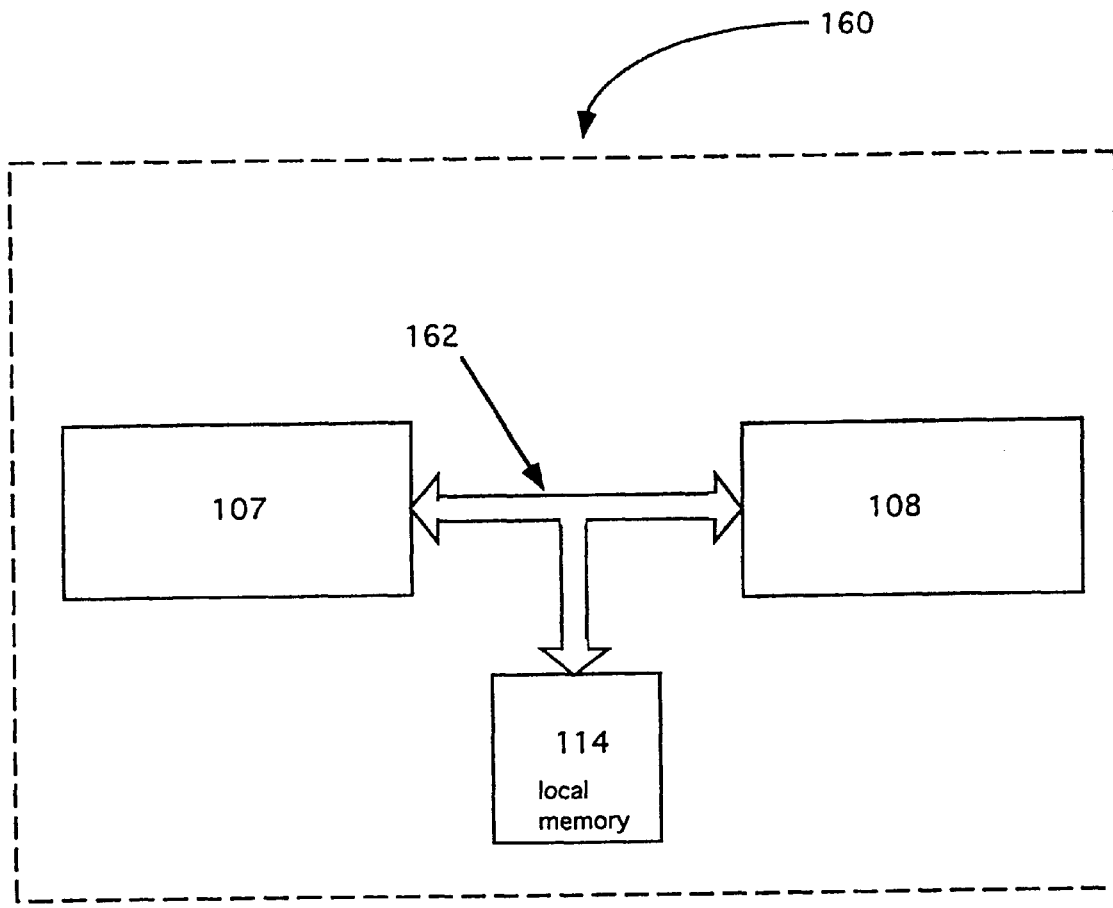
FIG. 1C is a board level schematic representation of local memory hierarchy of the universal circuit board represented in FIG. 1B.
Figure 2A:
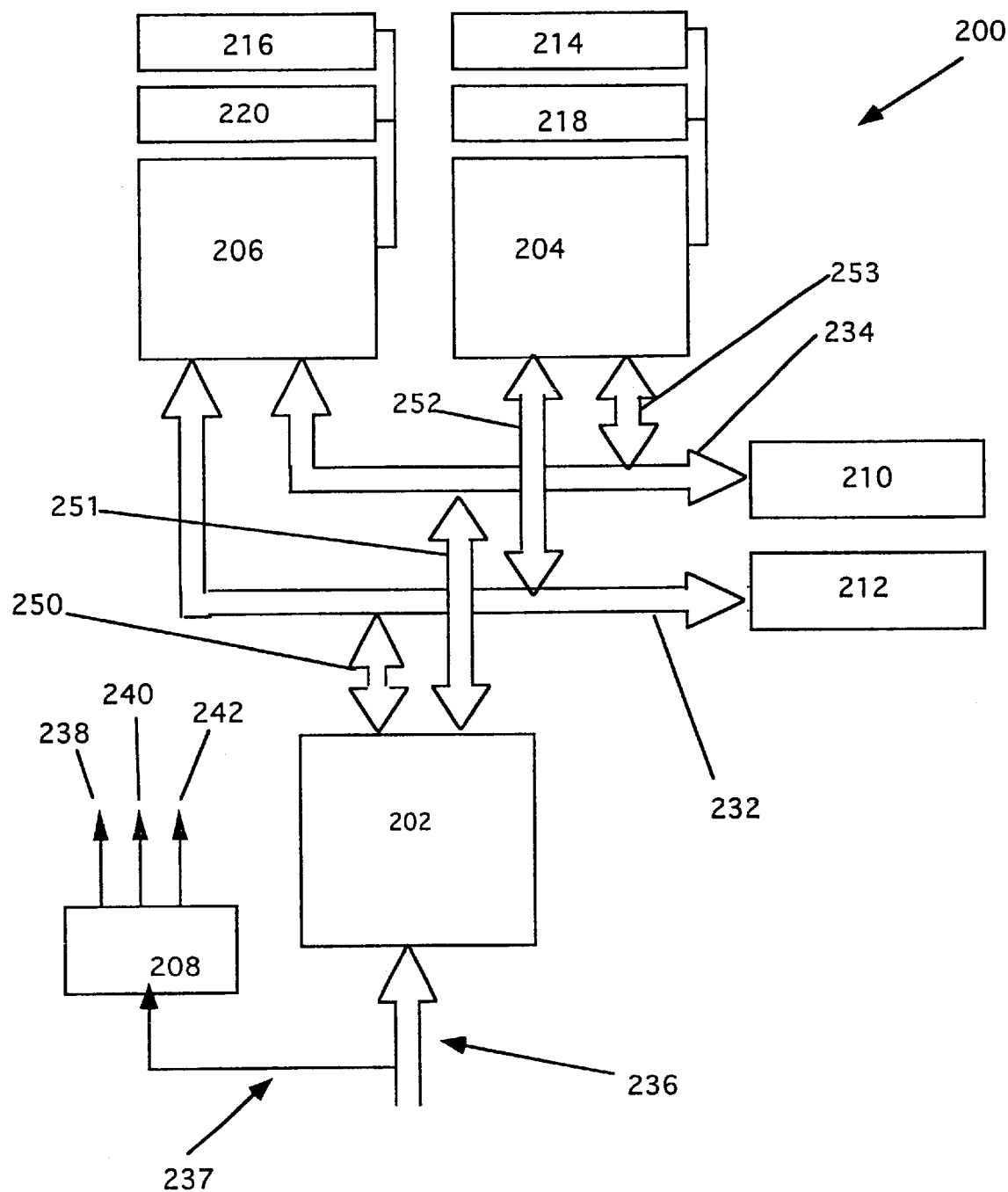
FIG. 2A is a functional block diagram of a reconfigurable computing system architecture utilizing use configurable PLDs according to one embodiment of the invention.

FIG. 2A is a functional block diagram of a reconfigurable computing system architecture 200 utilizing user configurable PLDs according to one embodiment of the invention. As shown, a data bus 236 is preferably electrically connected to an external host computer or external driver (not shown) as well as a user configurable PLD 202. A system clock 208 is electrically connected to data bus 236 by a clock connector 239. In this embodiment, PLD 202 is generally configured as a system controller and is hereinafter referred to as system controller PLD 202.

System clock 208 receives a bus clock signal 237 directly from data bus 236. In this embodiment, system clock 208 generates a first clock signal 238 representing the system clock frequency as well as a second clock signal 240 representing twice the system clock frequency and a third clock signal 242 representing one half the system clock frequency. System clock 208 may take the form of a Phase Locked Loop device or any suitable device for generating a reference clock signal.

A bi-directional data bus 232 directly connects a local memory device 212 and a user configurable PLD 206 while a bi-directional data bus 234 directly connects PLD 206 and a local memory device 210. In this embodiment, system controller PLD 202 is connected to data bus 232 by a connector bus 250 and to bi-directional data bus 234 by a connector 251 thereby electrically connecting system controller PLD 202 and PLD 206, local memory device 210, local memory device 212, and data bus 236. In the described embodiment, a user configurable PLD 204 is electrically connected to bi-directional data bus 234 by a connector 253 and to bi-directional data bus 232 by a connector 252. In this manner, system controller PLD 202, PLD 204, or PLD 206 may each independently communicate with each other or with either or both local memory device 210 and/or local memory device 212. In accordance with this embodiment, PLD 204 has an associated dedicated cache memory 218 as well as an associated I/O port 214 while PLD 206 has dedicated cache memory 220 and an associated I/O port 216.

Figure 2B:
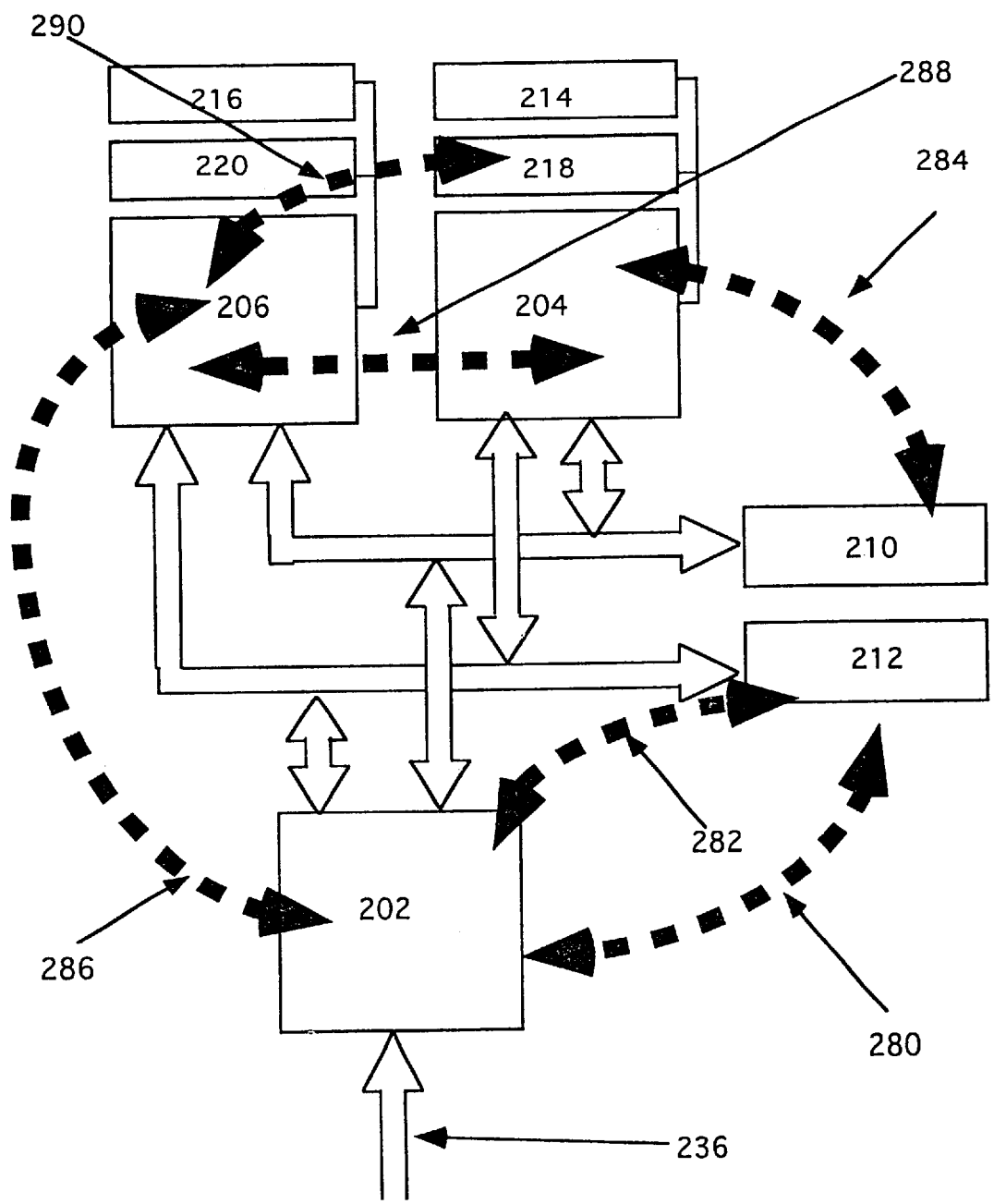
FIG. 2B an illustration of various datapath flows for a reconfigurable computing system architecture as illustrated in FIG. 2A.

A major advantage of having bi-directional memory busses 232 and 234 serve as a nexus for interconnecting the various components herein described can be amply demonstrated by the multiplicity of beneficial datapaths available to the user. By way of example, either bus 232 or bus 234 may be used for algorithm execution or reconfiguration when appropriate. An illustration of various datapath flows for an embodiment of the present invention is illustrated in FIG. 2B. This multiplicity of available datapaths enables the user to suitably customize computing system architecture 200. An example of such customization is the ability to concurrently execute an algorithm in PLD 204 while independently and simultaneously reconfiguring PLD 206 to run a different segment of the algorithm, and vice versa. As detailed below, this concurrency is possible since a configuration data set associated with an executable algorithm may be stored either in local memory 210 or local memory 212 and is thereby accessible to either PLD 204 or PLD 206 as well as system controller PLD 202. In another embodiment, an executable algorithm may be stored and executed within PLD 204 or PLD 206 under the control of system controller PLD 202.

A datapath 280 allows data transfer between user configurable system controller PLD 202 and either local memory 210 or local memory 212. By way of example, a datapath 280 allows configuration data resident on system controller PLD 202 to be transferred and stored in either local memory 210 or local memory 212. Conversely, a datapath 282 allows configuration data transfer from local memory 210 or local memory device 212 to system controller PLD 202. As a further example, any configuration data resident in either local memory 210 or local memory 212 is accessible by either PLD 204 or PLD 206 through a datapath 284. Advantageously, data path 284 also allows serial or parallel memory read or memory write operations between local memory device 210 or local memory device 212 and either PLD 204 or PLD 206.

A datapath 286 allows a direct data transfer operation between either PLD 204 or PLD 206 and system controller PLD 202. As an example, since PLD 202 is configured to operate as a system controller, datapath 286 allows direct transfer of command instructions from PLD 202 to either, or both, PLD 204 or PLD 206. Datapath 286 also allows direct transfer of any configuration data or executable algorithms from the host computer (not shown) to either or both PLD 204 or PLD 206. Furthermore, a datapath 288 allows a direct data transfer operation between PLD 204 and PLD 206. A datapath 290 allows PLD 204 to share the cache memory 220 associated with PLD 206 and conversely datapath 290 allows PLD 206 to share cache memory 218 associated with PLD 204, by connecting I/O 214 and I/O 216.

In the present embodiment, system controller PLD 202, PLD 204, and PLD 206 may take the form of EPF10K50™ programmable logic devices from the FLEX 10K™ family of devices manufactured by Altera Corporation of San Jose, Calif. However, it should be appreciated any suitable programmable logic device may be used. The FLEX 10K™ family of logic devices are configured at power up with data stored in an external device (such as a configurable EPROM device) or data that is provided by an external system controller. Configuration data may also be downloaded from system RAM or via any suitable downloading mechanism.

After a PLD has been initially configured, it can be reconfigured in-circuit by resetting the device and loading new data. As will be appreciated by those skilled in the art, reconfiguration is typically a relatively quick operation thereby permitting real-time changes to be made during system operation. By way of example, the FLEX 10K™50 requires less then 100 ms to reconfigure.

In the present embodiment, data bus 232 is multiplexed with the set of configuration pins for both PLD 204 and PLD 206 and data bus 234 is multiplexed the test pins from PLD 204 and PLD 206. In order to configure either, or both, PLD 204 or PLD 206, system controller PLD 202 must take control of data bus 232. In this manner, system controller PLD 202 can reconfigure both PLD 204 and PLD 206 simultaneously using the same configuration data.

A programmable logic device includes an array of logic cells that can be individually programmed and arbitrarily interconnected to each other to provide internal input and output signals thus permitting the performance of highly complex combinatorial and sequential logic functions. The program is implemented in the programmable logic device by setting the states of programmable elements. As known to those skilled in the art, the configuration data provides the instruction set for setting the states of the programmable elements. If these programmable elements used are volatile memories, the memory cells must be reconfigured upon system power up in order to restore the programmable logic device to a desired programmed state.

Figure 3A:
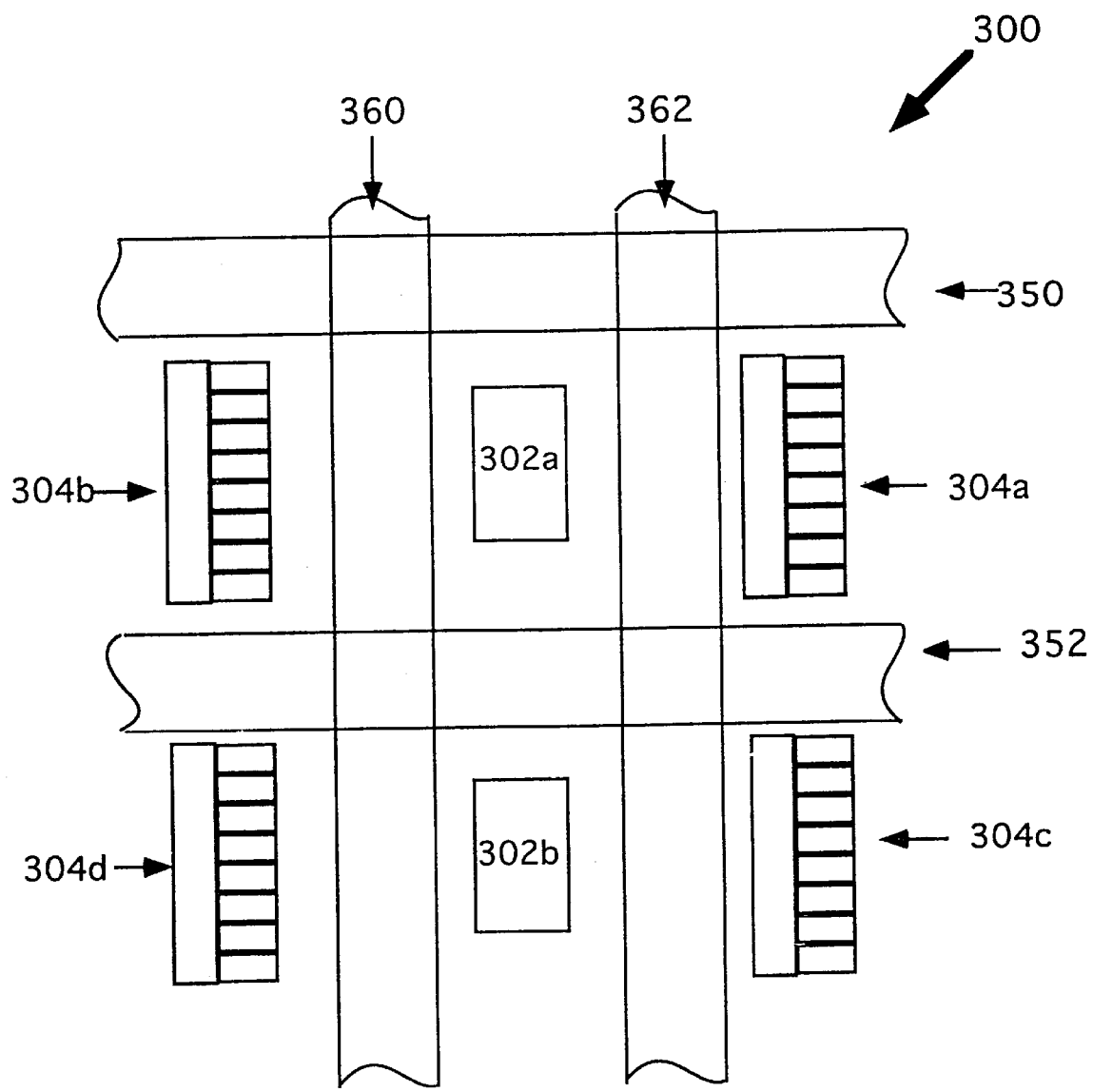
FIG. 3A is a block diagram of the programming architecture of an embedded array logic programmable logic device.

By way of example, an embedded array logic programmable logic device, as exemplified by the FLEX10K™ logic family of devices, is one in which the basic programming elements take the form of an embedded array unit and a logic array unit. As shown in FIG. 3A, the basic programming elements of the embedded array logic programmable logic device take the form of an embedded array unit 302 and a logic array unit 304a.

There are typically a plurality of logic array units arranged in rows and columns with at least one embedded array block located in each row. By way of example, logic array blocks 304a and 304b are arranged to form a row 350 wherein a single embedded array block 302a is contained. A second row 352 formed by the arranging of logic array block 304c and 304d and embedded array block 302b in a substantially similar pattern. The rows and columns are electrically connected by appropriately situated interconnectors thereby forming an array of logic array blocks with a plurality of embedded array blocks suitably interspersed therein. As an example, row 350 is electrically connected to a column 360 and a column 362 and row 352 is electrically connected to column 360 and column 362 thereby forming an array of programmable elements.

Figure 3B:
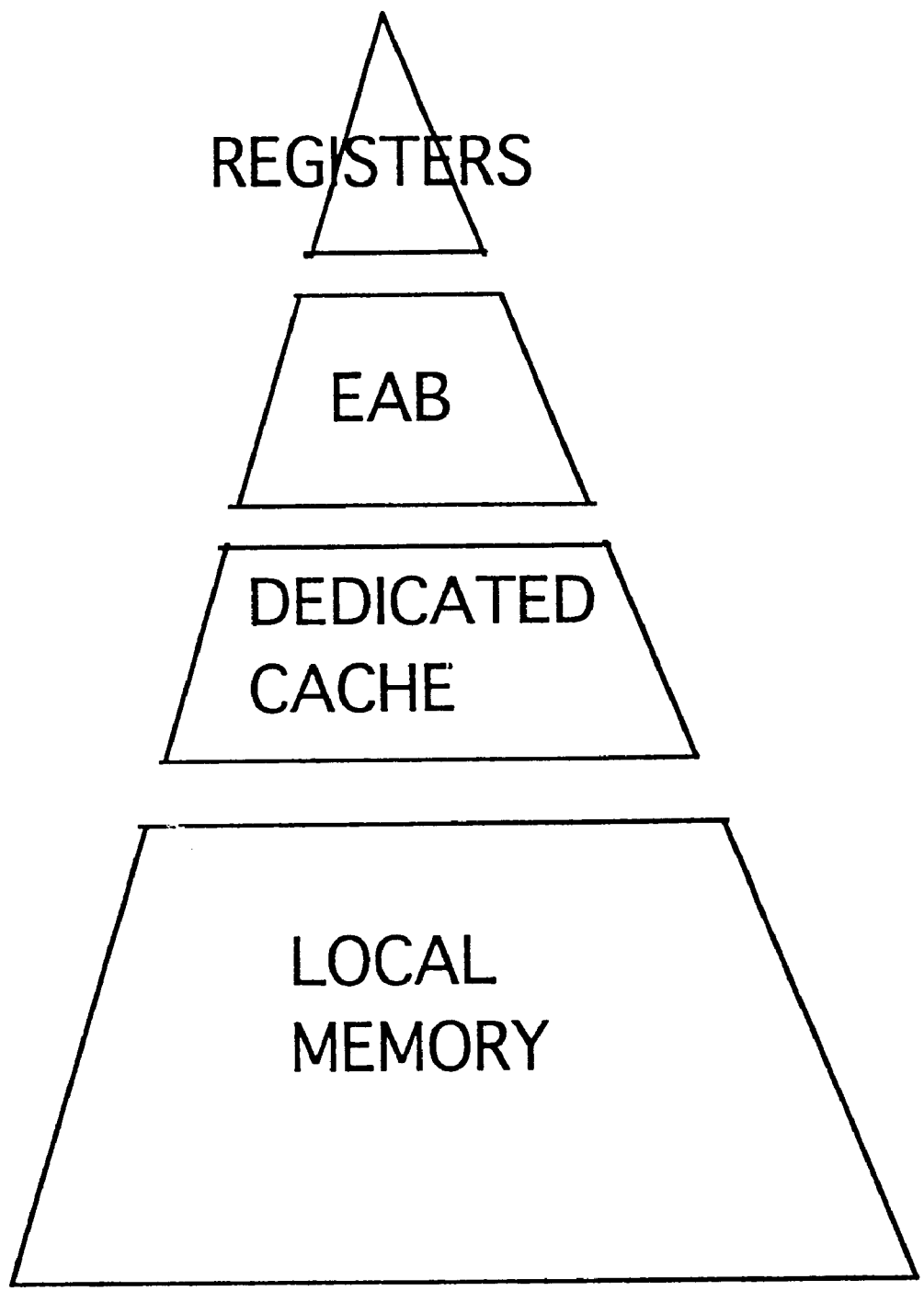
FIG. 3B is an illustration of the memory hierarchy in the reconfigurable computing architecture as illustrated in FIG. 2A.

FIG. 3B is an illustration of the memory hierarchy in the reconfigurable computing architecture 200 according to a preferred embodiment. There are four levels of memory hierarchy in the computing system architecture 200. In the described embodiment, the programmable logic devices each have register level memory contained within the logic array unit. The embedded array block as described above each contain RAM memory, PLD 204 and PLD 206 each have one private cache memory, and system controller PLD 202, PLD 204, and PLD 206 each have direct access to local memory 210 or local memory 212. In the present embodiment, cache memory 218 and cache memory 220 and local memory 210 and local memory 212 make take the form of a 1M×32 SRAM device but may be any configuration or memory type suitable for the application.

Figure 4:
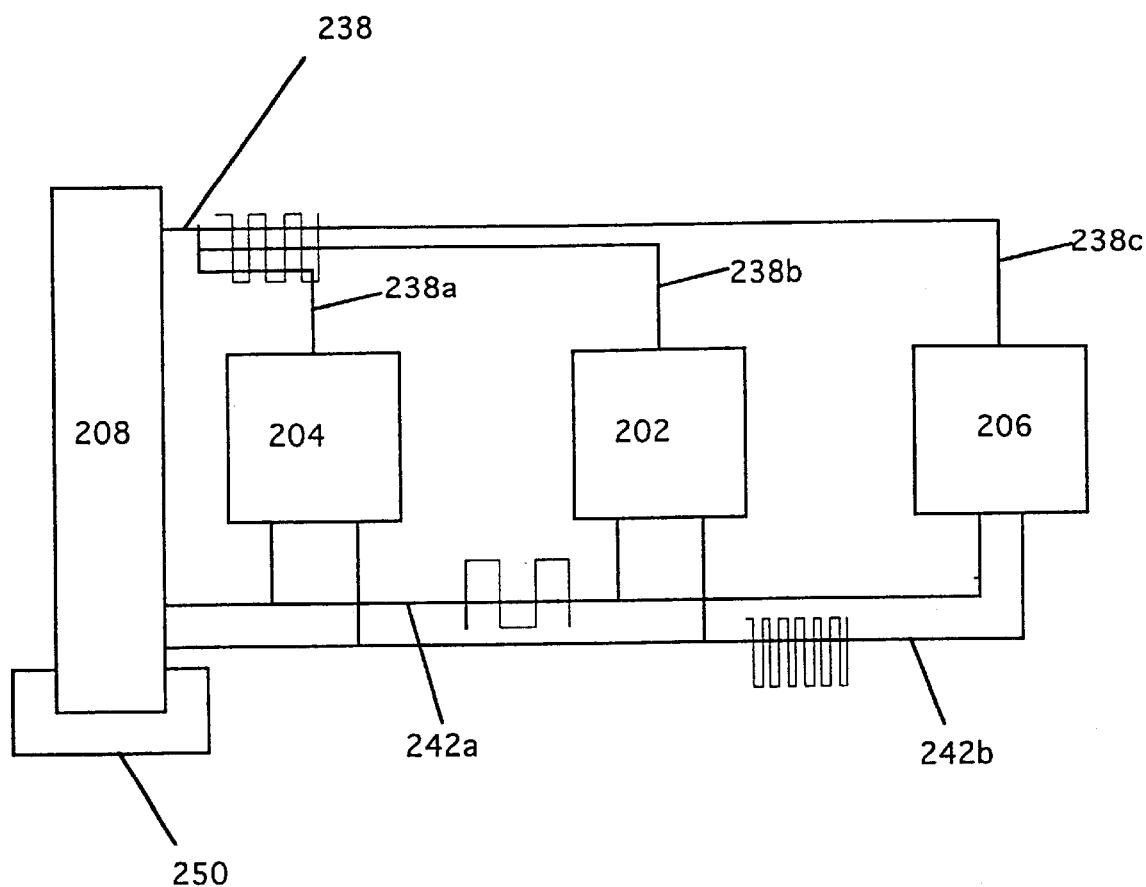
FIG. 4 is a block diagram of a phase locked loop system clock routing pattern according to one embodiment of the invention.

FIG. 4 is a block diagram of system clock 208 routing pattern according to a preferred embodiment. Typically, if the system clock signal on a board goes to one PLD acting as the system controller the clock skew introduced by the system is so great that the system controller effectively cannot control the other PLDs in the system. Accordingly, system clock 208 drives clock signal 238 to each of PLD 204, system controller PLD 202, and PLD 206 by way of a plurality of clock nets. In this embodiment, a first clock net 238a connects PLD 204 to system clock 208, a second clock net 238b connects system controller PLD 202 to system clock 208, and a third clock net 238c connects PLD 206 to system clock 208. The path length of each of the above described clock nets are matched to the path length of a feedback loop net 250 thereby substantially eliminating system clock skew.

A plurality of shared nets including a shared clock net 242a and a shared clock net 242b electrically connect system clock 208 to system controller PLD 202, PLD 204 and PLD 206. The path lengths of shared clock net 242a and shared clock net 242b are electrically equivalent thereby substantially eliminating signal skew between the system controller represented by system controller PLD 202 and either PLD 204 or PLD 206.

In general, providing multiple clocks with double-frequency intervals allows a user to implement key functions otherwise not available. For example, if the system frequency was chosen by the user to be a clock frequency represented by clock signal 238, then clock signal 242b could be used to implement a cycle-shared FIFO. Alternatively, clock signal 242b could be used to generate a write enable pulse for an asynchronous RAM.

Figure 5:
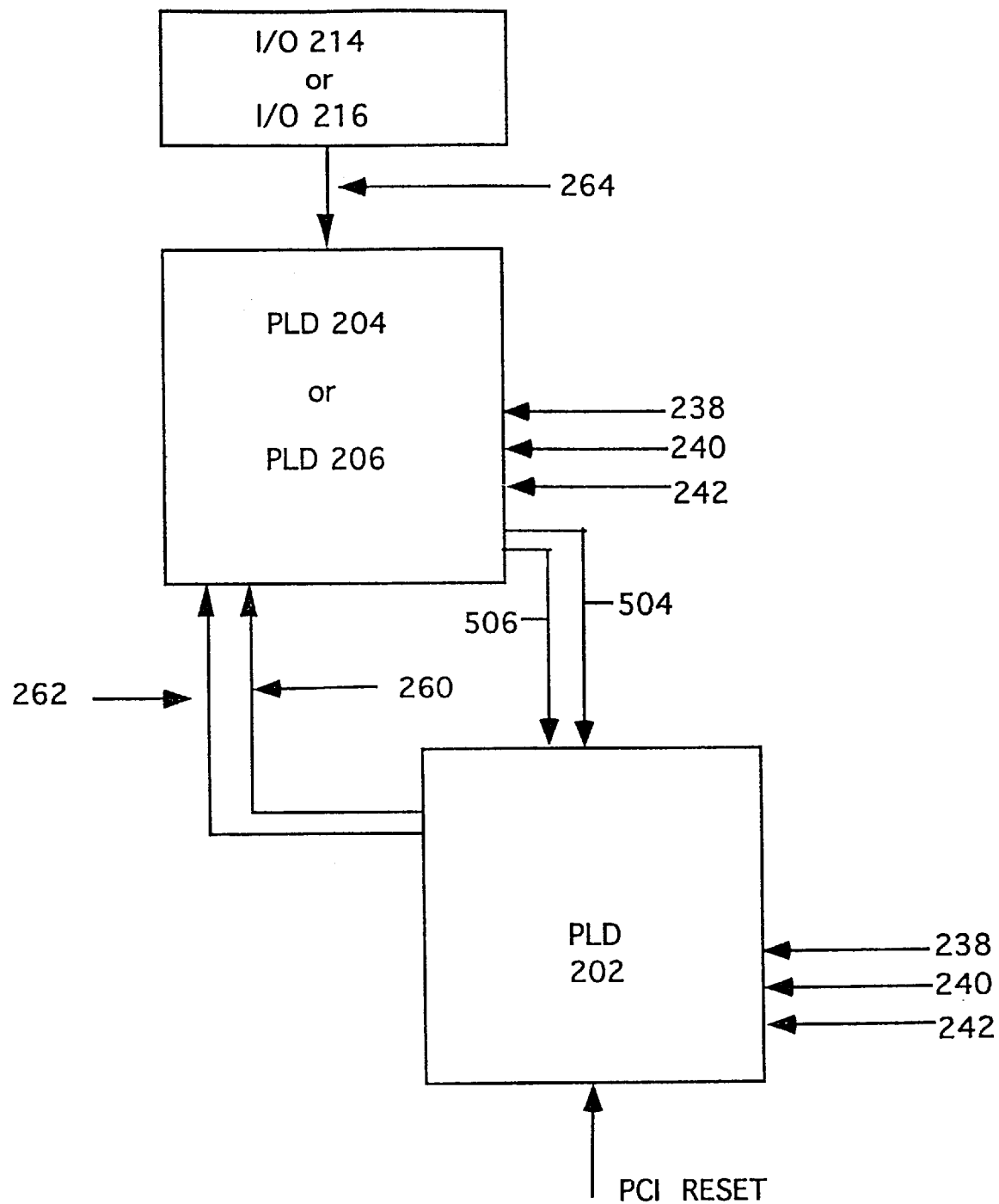
FIG. 5 is a block diagram of the secondary signal configuration for a user configured system controller PLD according to one embodiment of the invention.

FIG. 5 is a block diagram of the secondary signal configuration for a user configured system controller PLD according to the described embodiment. It is intended that the unidirectional secondary global signals be used as the grant signals for the memory arbitration circuitry, or as global clock enables for debugging purposes as well as distribution of low skew, high fanout signals such as a reset or clear signal. The secondary signal also are intended to provide any additional clocks which may be required for debugging purposes. In the described embodiment, system controller PLD 202 has a plurality of fast inputs including a first fast input 504 supplied by PLD 204 or PLD 206 and a second fast input 506 supplied by PLD 204 or PLD 206. Additional fast inputs are provided by clock signal 238, clock signal 240, and clock signal 242 as supplied by system clock 208. Input/output port 214 may supply an I/O signal 264 to PLD 204 and I/O port 216 may supply an I/O signal 264 to PLD 206. Additionally, system controller PLD 202 may independently provide fast inputs 260 and 262 each to PLD 204 and 206.

Figure 6:
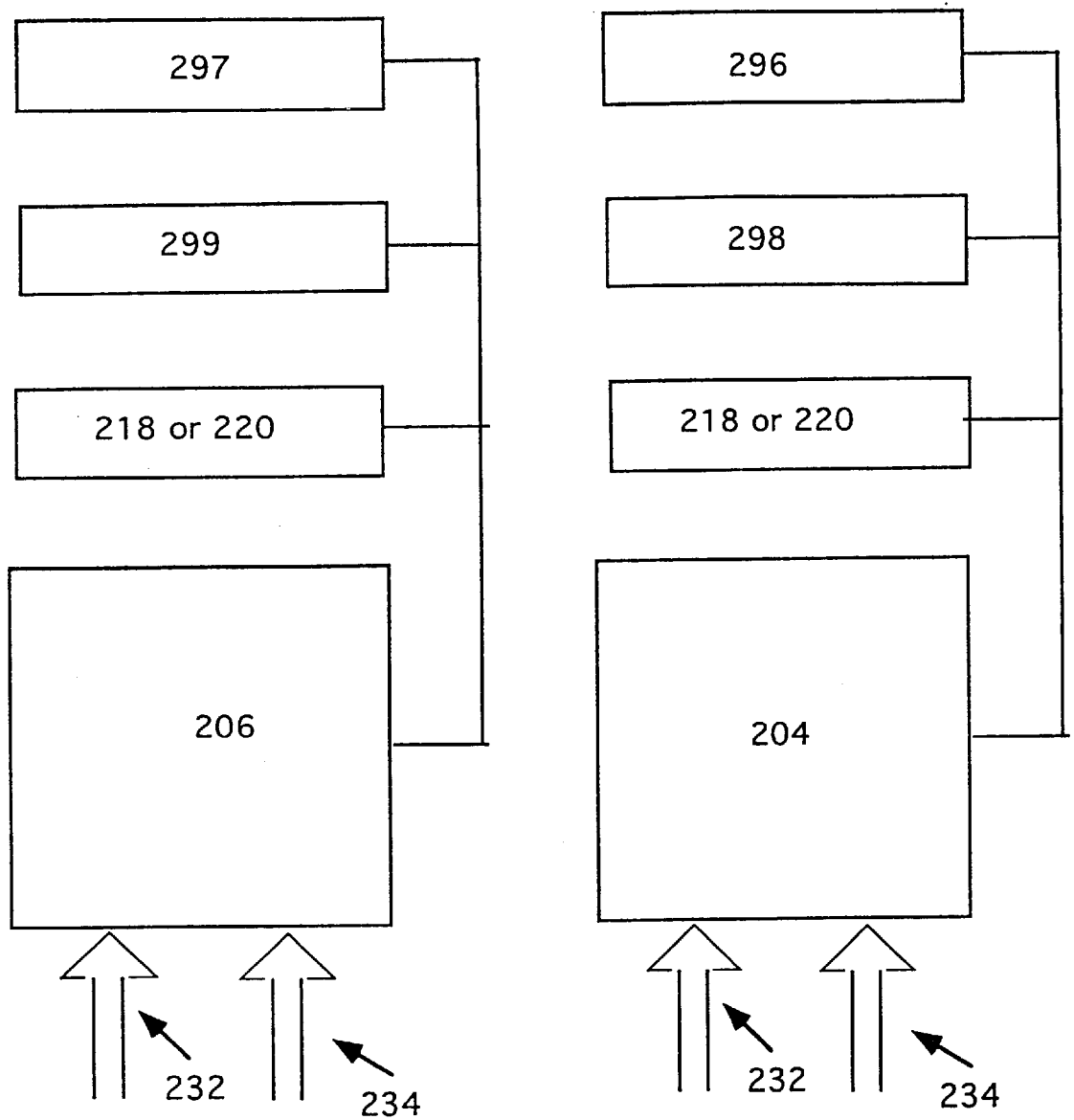
FIG. 6 is a block diagram of a specific output configuration of one embodiment of the invention.

FIG. 6 is a block diagram of a specific configuration of the described embodiment. As shown, either PLD 204 or PLD 206 may have its respective I/O port shared with its respective dedicated memory cache signals. Four byte enable signals are used to differentiate between I/O port 214 or I/O port 216 and the respective dedicated memory cache. The I/O signals can be used to implement any external protocol (e.g., a DRAM interface) and may be connected to any or each of a plurality of headers 296–299 each having 34 pins. In this embodiment, PLD 204 is coupled to headers 296 and 298 while PLD 206 is connected to headers 297 and 299. In one embodiment, header 296 provides a 32 bit data bus, a write enable signal, and a ground pin and header 298 provides the 20 bit data bus, four byte enables, five general purpose I/O signals and a ground pin. All headers 296–299 are advantageously arranged in an interstitial manner to facilitate easy connection between PLD 204 and PLD 206.

Figure 7:
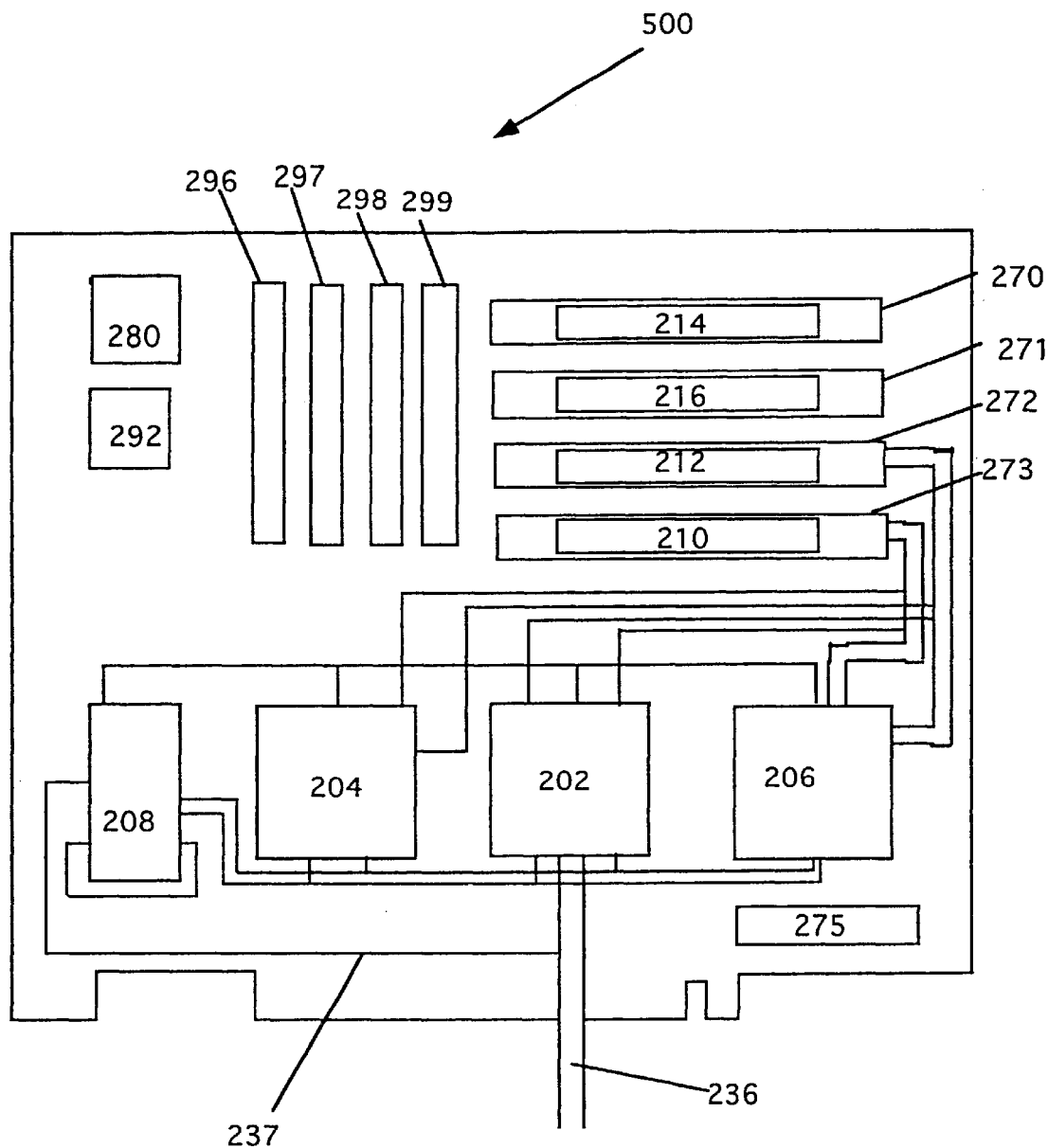
FIG. 7 is an illustration of a universal printed circuit board based on reconfigurable computer architecture using PLDs as illustrated in FIG. 2A.

FIG. 7 is an illustration of a reconfigurable computing system printed circuit board according to an embodiment of the present invention. In reference to computing system architecture 200 illustrated in FIG. 2A and FIG. 2B as well as FIGS. 3–6, a printed circuit board 500 in accordance with the present invention is presented. In the described embodiment, board 500 may be connected to an external host computer or other external driver by bus 236 which may be a PCI bus. As described in FIG. 4, PLD 202, PLD 204, and PLD 206 are placed on board 500 in such a manner so as to substantially eliminate clock skew induced by variant clock signal path lengths from system clock 208. In one embodiment, PLDs 202, 204 and 206 may be represented by the EPF10K50™ device and system clock 208 may take the form of a Phase Locked Loop clock signal generator. Referring to FIG. 2A, clock signal 237 may be on the order of 33 MHz or any frequency deemed suitable. A power supply port 275 supplies any external power required to maintain board level functionality. A data bus 236 is electrically connected to PLD 202 concurrently with an external host computer or driver (not shown).

A plurality of SRAM memory sockets 270, 271, 272, and 273 provide connection ports for local memory 210 and local memory 212 as well as dedicated cache memory 220 and dedicated cache memory 218. In the present embodiment, SRAM sockets 270–273 and memory busses 232 and 234 each provide a total of 57 signals which include a 32 bit data bus, a 20 bit address bus, four individual byte enables and one write enable.

An on-board data storage device 280 may contain configuration data used to configure PLD 202 during an initial board power up sequence. In yet another embodiment, on-board storage device 280 may be a read/write non-volatile memory device such as an electrically erasable programmable read only memory (i.e., EEPROM) where configuration data may be stored and re-written during board operation. In the described embodiment, a serial port 292 is present which enables user specific system controller configuration serial data transfer to PLD 202 or in another embodiment serial data transfer to on-board storage device 280. Advantageously, output connectors 296, 297, 298, and 299 are interstitially arranged in for electrically connecting output port 216 and output port 214. In this manner, jumpers connecting output ports 214 and 216 are all that is required.

Figure 8:
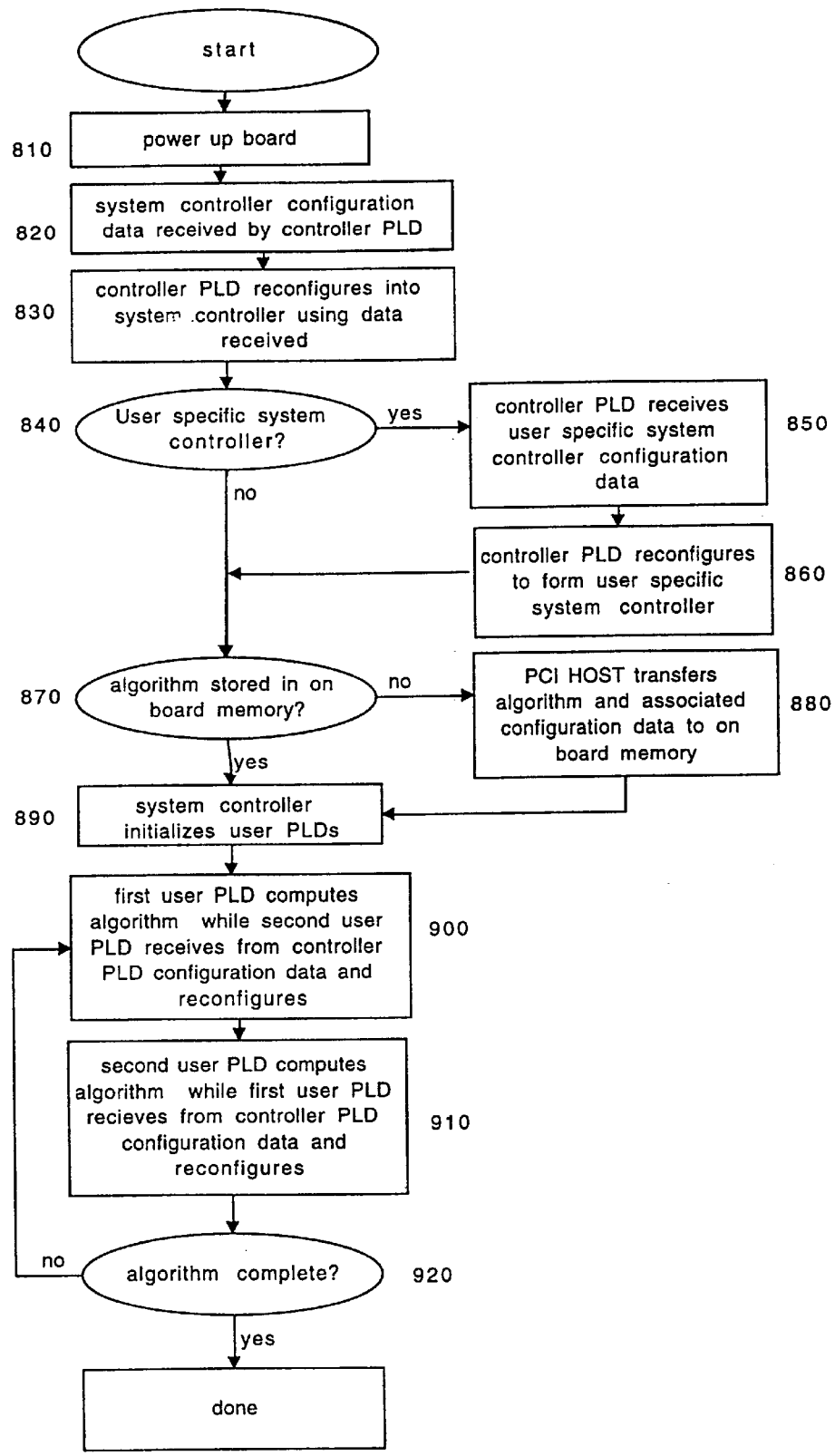
FIG. 8 is a flowchart illustrating the operation of a reconfigurable computer universal circuit board using PLDs according to an embodiment of the present invention.

FIG. 8 is a flowchart illustrating the operation of a reconfigurable computing circuit board using PLDs according to an embodiment of the present invention. The operation of a reconfigurable computing board 500 can be described as follows.

Generally, during initial power up, a typical host computer will attempt to establish memory address locations in the host computer's main memory for all auxiliary boards. For this reason, upon initiation of the host computer power up sequence any auxiliary board communicating with the host computer must become immediately active. In this embodiment, PLD 202, PLD 204, and PLD 206 at initial system power up are in an undetermined state since no configuration data is stored within each programmable logic device after power down. As shown in FIG. 8, step 810 includes powering up board 500 substantially concurrently with powering up the host computer. In order for board 500 to communicate with the PCI BIOS on the host computer, PLD 202 must be configured to become a system controller.

Step 820 includes transferring an initialization configuration data stream from on-board storage device 280 to PLD 202. In another embodiment, serial input port 292 may supply initialization configuration data stream to PLD 202 directly. Step 830 includes PLD 202 using the received initialization configuration data stream to create a system controller. Once configured as a system controller, PLD 202 may use data bus 236 to communication with the host computer's PCI BIOS. The host computer's PCI BIOS will then allocate some memory address spaces in its main memory for board 500.

In some circumstances a user may desire a user specific system controller. Step 840 includes querying whether a user specific operating system is required. If a user does in fact require a user specific system controller, the present invention advantageously allows real time reconfiguration of PLD 202. Step 850 includes receiving a user specific configuration data stream by PLD 202 whereupon step 860 includes PLD 202 reconfiguring to form user specific system controller.

Once PLD 202 has been configured as a system controller, board 500 is ready to execute any appropriate algorithm. In one embodiment, step 870 queries if the desired algorithm and associated configuration data set is resident in on-board memory such as local memory 210 or local memory 212. In another embodiment, the desired algorithm may be stored on either PLD 204 or PLD 206 and the associated configuration data may be stored in either local memory 210 or local memory 212, or vice versa. It should be noted that in this embodiment, data bus 232 is multiplexed with configuration pins for both PLD 206 and PLD 204, and data bus 234 is multiplexed with test pins from PLD 206 and PLD 204. Preferentially the algorithm will be stored in local memory 210 which is connected to data bus 234 and the configuration data will be stored in local memory 212. In this manner the system controller PLD 202 will able to configure PLD 206 while substantially simultaneously executing the algorithm on PLD 204.

If the desired algorithm and associated configuration data are not located in any on-board memory device, step 880 includes a host computer transferring the required data over data bus 236 via any appropriate datapath, including but not limited to those datapaths illustrated in FIG. 2B, to any suitable on-board memory device which may include local memory 210 and local memory 212. In yet another embodiment, for any algorithm too large to store in any combination of on-board memory devices, an external data storage medium may be used in conjunction with a real time data transfer link to board 500. One of the advantages of the present invention is the flexibility accorded the user in execution of any algorithm.

Step 890 includes system controller PLD 202 initializing PLD 204 and PLD 206 prior to actual initiation of the execution of the algorithm now stored in an on-board storage device. Initialization step 890 establishes the appropriate initial state for both PLD 204 and PLD 206 prior to actual execution of any resident algorithm. Subsequent to successful initialization of PLD 204 and PLD 206, step 900 includes a first PLD beginning the actual execution of the resident algorithm while a second PLD substantially simultaneously reconfigures itself in order to take over the execution from the first PLD at an appropriate time. Step 910 includes the step of the second PLD actively executing a different portion of the algorithm subsequent to successful reconfiguration while substantially simultaneously, the first PLD reconfigures itself to take over the execution of the algorithm. Step 920 includes determining whether or not the algorithm has reached it conclusion. If it is determined that the algorithm has not concluded then control is again passed to the first PLD, otherwise, a completed signal is sent to the system controller.

Although the foregoing invention has been described in some detail for purposes of clarity of understanding, it will be apparent that certain changes and modifications may be practiced within the scope of the appended claims. It should be noted that there are may alternative ways of implementing the present invention. By way of example, a multiplicity of programmable devices may be used whereby a system controller is distributed amongst more than a single programmable device. In yet another embodiment, an executable algorithm may reside within the same device as the system controller wherein the associated configuration data is resident in local memory or some other storage medium. It is therefore intended that the following appended claims be interpreted as including all such alterations, permutations, and equivalents as fall within the spirit and scope of the present invention.

What is claimed is:

1. A method of computing using a first independently programmable integrated circuit and a second independently programmable integrated circuit, said method comprising:

configuring a first portion of the first integrated circuit as a controller;

implementing an algorithm utilizing a second portion of the second integrated circuit, the implementation of the algorithm being directed by the first portion of the first integrated circuit operating as the controller, wherein, as needed, a third portion of the second integrated circuit is configured to operate as the controller in place of or in conjunction with the first portion of the first integrated circuit; and reconfiguring a fourth portion of the first integrated circuit concurrently with the implementing of the algorithm in the second portion of the second integrated circuit, the reconfiguring of the fourth portion of the first integrated circuit being directed by the first portion of the first integrated circuit operating as the controller, or by the third portion acting as the controller, wherein the first and the second integrated circuits are interconnected by a bi-directional bus, such that, as needed, any appropriate portion of either the first or the second integrated circuit can be reconfigured as needed.

2. A method as recited in claim 1, wherein the bi-directional bus is used by the second integrated circuit during the implementation of the algorithm and the bi-directional bus is used by the controller to reconfigure the third portion of the second integrated circuit.

3. A method as recited in claim 2, wherein a first configuration data set suitable for reconfiguring the third portion of the second integrated circuit is stored in a memory unit connected to the independent bi-directional bus.

4. A method as recited in claim 1, wherein said method further comprises generating a multiplicity of timing signals that are delivered to each of the programmable integrated circuits, wherein the reconfiguration may be done at a different clock speed than the implementation of the algorithm.

5. A method as recited in claim 1 further comprising reconfiguring the second portion of the second integrated circuit under the direction of the first portion of the first integrated circuit operating as the controller while the reconfigured third third portion executes an associated second algorithm.

6. A method as recited in claim 1, wherein the implementing an algorithm further comprises the first portion operating as the controller utilizing a second independent bi-directional bus to transfer the algorithm from a memory unit to the second portion of the integrated circuit, the second bi-directional busses being coupled to the memory unit.

7. A method as recited in claim 1, wherein the implementing an algorithm further includes the first portion operating as the system controller directing the second portion to utilize the second bus to transfer control of at least an unexecuted portion of the algorithm to the reconfigured fourth portion.

8. A method as recited in claim 1 wherein at least one of the first integrated circuit and the second integrated circuit takes the form of a programmable logic device.

9. A reconfigurable computing system comprising:
   a first programmable integrated circuit;
   a second programmable integrated circuit;
   a system controller that is a configured portion of the first integrated circuit; and
   a pair of independent, bi-directional busses, each bus being arranged to electrically interconnect the configured portion of the first integrated circuit operating as the system controller and the second integrated circuit, such that a first one of the busses may be used to reconfigure a selected portion of the of the second integrated circuit under the direction of the configured portion of the first integrated circuit as system controller, while a second one of the busses is used by a third portion of the second integrated circuit configured to be an operational portion, and wherein as needed, the selected portion and the operational portion of the can be reconfigured to operate as the system controller in conjunction with or in place of the configured portion of the first integrated circuit operating as system controller.

10. A computing system as recited in claim 9 further comprising:
    a first memory unit electrically interconnected to a first one of the buses;
    a second memory unit electrically interconnected to a second one of the buses; and
    an input/output device capable of transmitting data to and receiving data from the computing system.

11. A computing system as recited in claim 9 further comprising:
    a first configuration data set, the first configuration data being used to configure the system controller; and
    a second configuration data set, the second configuration data set being used to configure the second portion, and
    a third configuration data set, the third configuration data set being used to configure the third portion.

12. A computing system as recited in claim 9 further comprising a system clock which provides a plurality of distinct timing signals to the system controller and the second integrated circuit.

13. A computing system as recited in claim 9 wherein at least one of the integrated circuits has a memory cache and an input/output port.

14. A computing system as recited in claim 13 wherein at least one of the integrated circuits is a programmable logic device.

* * * * *